Patented June 9, 1936

2,043,282

UNITED STATES PATENT OFFICE 2,043,282

HYDROXY-DIPHENYL-ISATIN CONDENSATION DERIVATIVES

Walter G. Christiansen, Glen Ridge, N. J., and Sidney E. Harris, Lynbrook, N. Y., assignors to E. R. Squibb & Sons, Brooklyn, N. Y., a corporation of New York No Drawing. Application June 11, 1932, Serial No. 616,746

10 Claims. (Cl. 260—48)

This invention relates to hydroxy diphenyl isatin condensation derivatives and the method of preparing them. More particularly it relates to the products obtained by the condensation of isatin with two molecules of meta hydroxy diphenyl and two molecules of ortho hydroxy diphenyl, respectively.

In general, these compounds may be prepared by condensing two molecules of a hydroxy diphenyl or a hydroxy diphenyl derivative, such as a halogen or alkyl derivative, with isatin or a derivative of isatin, such as dichlor isatin. Methods of preparing the ortho hydroxy diphenyl isatin condensation compound and the meta hydroxy diphenyl isatin condensation compound are given below, but it is intended and is to be understood that the invention is not limited thereto, but also includes the para hydroxy diphenyl condensation product and derivatives of all three such condensation products in which various organic and inorganic radicals are introduced into one or both of the hydroxy diphenyl nuclei or into the isatin nucleus.

We have found that there is a wide difference in the solubility of various of these condensation products in alkali. Some products are readily soluble, whereas others are substantially insoluble in alkali. We believe that the two hydroxy groups of the substantially insoluble compounds have undergone internal condensation, eliminating one molecule of water and forming a bridge. Therefore, in referring to the condensation products of hydroxy diphenyls and isatin, we intend to include both the condensation products which comprise two hydroxy groups and condensation products from which one molecule of water may have been eliminated.

Example 1

*Condensation product of meta hydroxy diphenyl and isatin (3,3)*

23.5 grams of 3-hydroxy diphenyl are dissolved in 60 grams of glacial acetic acid and 10 grams of isatin are suspended in the solution. 20 grams of concentrated $H_2SO_4$ are then added dropwise to the well-stirred suspension. When the addition is complete, the stirring is continued until the precipitate formed on dilution of a test portion with water is no longer red colored. The whole reaction mixture is then added to 400 grams of water and the precipitate washed several times by decantation with water. It is then extracted with boiling dilute NaOH and the insoluble material filtered off. This insoluble product is then dissolved in alcohol and decolorized by treating with charcoal. After filtering off the charcoal the alcoholic solution is diluted with about five volumes of water and heated on the steam bath until the alcohol has been evaporated. The condensation product which is precipitated by this treatment is filtered off, washed thoroughly with water, and dried; melting point—188–190° C.

This compound is quite insoluble in aqueous alkali and it is, therefore, supposed that the composition is that represented by the following formula:

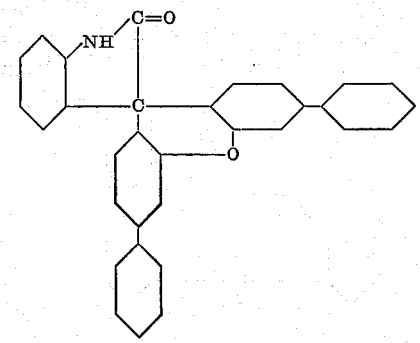

Example 2

*Condensation product of ortho hydroxy diphenyl and isatin (3, 3)*

20 grams of ortho-hydroxy diphenyl are warmed to about 60° and to the molten material 5 grams of isatin are added. To the well-stirred suspension of the isatin in the molten ortho phenyl phenol 2 cc. of concentrated sulfuric acid are added dropwise. A strongly exothermic reaction sets in which is completed in a few minutes without application of external heat, the reaction mixture setting to a hard cake. This cake is pulverized and the powdered material boiled with water until any traces of unchanged ortho hydroxy diphenyl have been volatilized with the steam. After cooling the solid reaction product is filtered off and dissolved in dilute sodium hydroxide solution. The solution is filtered and the diortho hydroxy diphenyl isatin is reprecipitated in the form of a white powder by the addition of a sufficient quantity of hydrochloric acid. The powder is filtered off, washed with water, and dried.

The condensation product thus formed is readily soluble in dilute aqueous solutions of alkali, is insoluble in water and has a melting point of 183–185° C. It is presumed that the composition may be represented by the following formula:

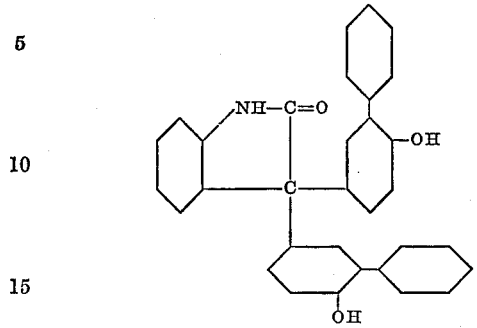

Example 3

Condensation product of 3-chlor 2-hydroxy diphenyl and isatin (3,3)

7.4 grams of isatin are suspended in 20.5 grams of 3-chlor 2-hydroxy diphenyl and the mixture heated to about 60° C. with stirring. 5 cc. of concentrated sulfuric acid are added dropwise and heating and stirring continued until a sample withdrawn from the mixture shows no isatin color on mixing with water. The whole reaction mixture is then treated with cold dilute NaOH and any insoluble material filtered off. On acidification with dilute $H_2SO_4$ the condensation product is precipitated. After recrystallization from benzol it forms a slightly yellow powder, which does not melt but decomposes slowly on heating to 240–250° C. Probably the structure is:

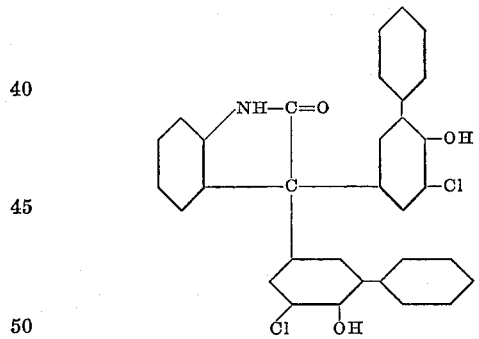

Example 4

Condensation product of 5-nor-propyl-2-hydroxy-diphenyl and isatin (3,3)

21.3 grams 5-nor-propyl-2-hydroxy-diphenyl are dissolved in 50 cc. glacial acetic acid and 7.4 grams isatin suspended in the solution. 20 grams concentrated $H_2SO_4$ are then added in a slow stream with good stirring. The temperature rises spontaneously to about 60° C. and is maintained at 60–80° by external heating until a test portion added to water shows no isatin color. The whole reaction mixture is then poured gradually into 300 cc. well-stirred cold water and the flocculent yellow precipitate is filtered off and washed with water. After recrystallization from a mixture of benzol and petroleum ether it forms a pale yellow powder, M. P. 130–131° C., insoluble in dilute alkali. From this we conclude that water has been eliminated between the two phenolic hydroxyl groups and that the formula is:

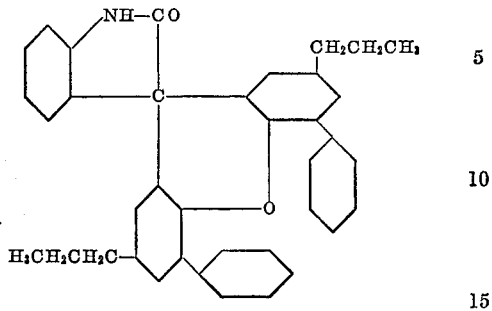

We claim:
1. The condensation product of isatin and meta hydroxy diphenyl which has a melting point of about 190° C. and which is soluble in alcohol but insoluble in water or aqueous alkali hydroxides.
2. The condensation product of isatin and ortho hydroxy diphenyl which has a melting point of 183–185° C. and which is soluble in aqueous alkali hydroxides but insoluble in water.
3. Condensation products of a mono-hydroxy diphenyl and isatin.
4. Condensation products of a halogenated mono-hydroxy diphenyl in which the halogen atom is nuclearly substituted on the hydroxylated phenyl nucleus and isatin.
5. Condensation products of a lower-alkylated mono-hydroxy diphenyl in which the alkyl group is nuclearly substituted on the hydroxylated phenyl nucleus and isatin.
6. Condensation products of a phenol selected from the group consisting of ortho hydroxy diphenyl, meta hydroxy diphenyl, para hydroxy diphenyl, hydroxy diphenyls having a halogen nuclearly substituted on the hydroxylated phenyl nuclei and hydroxy diphenyls having an alkyl group of the lower aliphatic series nuclearly substituted on the hydroxylated phenyl nuclei, and isatin.
7. The method of preparing hydroxy diphenyl isatin condensation derivatives, which comprises condensing a phenol selected from the group consisting of ortho hydroxy diphenyl, meta hydroxy diphenyl, para hydroxy diphenyl, hydroxy diphenyls having a halogen nuclearly substituted on the hydroxylated phenyl nuclei, and hydroxy diphenyls having an alkyl group of the lower aliphatic series nuclearly substituted on the hydroxylated phenyl nuclei, with isatin.
8. The method of preparing hydroxy diphenyl isatin condensation products which comprises condensing two molecules of a mono-hydroxy diphenyl with one molecule of isatin.
9. The method of preparing the condensation product of isatin and meta hydroxy diphenyl which comprises condensing one molecule of isatin with two molecules of meta hydroxy diphenyl suspended in glacial acetic acid.
10. The method of preparing the condensation product of isatin and ortho hydroxy diphenyl which comprises condensing one molecule of isatin with two molecules of molten ortho hydroxy diphenyl.

WALTER G. CHRISTIANSEN.
SIDNEY E. HARRIS.